United States Patent Office 3,700,431
Patented Oct. 24, 1972

3,700,431
PREPARATION AND METHOD OF FEEDING COPPER CONCENTRATES AND METHOD OF TAPPING COPPER IN THE CONTINUOUS SMELTING AND CONVERTING PROCESS
Nickolas J. Themelis, Beaconsfield, Quebec, and Peter Tarassoff, Dollard des Ormeaux, Quebec, Canada, assignors to Noranda Mines Limited, Toronto, Ontario, Canada
No Drawing. Application Apr. 14, 1969, Ser. No. 832,529, now abandoned, which is a continuation-in-part of application Ser. No. 627,851, Apr. 3, 1967, now Patent No. 3,561,951. Divided and this application Dec. 29, 1970, Ser. No. 102,564
Claims priority, application Great Britain, Apr. 28, 1966, 18,647/66
The portion of the term of the patent subsequent to Feb. 9, 1988, has been disclaimed
Int. Cl. C22b 15/00, 15/06, 15/14
U.S. Cl. 75—73                                                                   8 Claims

ABSTRACT OF THE DISCLOSURE

In a continuous process for smelting and converting copper concentrates to metallic copper, improvements in terms of minimizing the dust loss from the concentrates can be achieved by feeding the concentrates in the form of pellets. The feeding of the pellets and the injection of oxidizing gas used in such process may be so controlled as to provide smelting rates of between about one hundred pounds and about three hundred pounds per square foot of bath surface per hour. Dust losses may be maintained between about 0.85% and 2.14% by weight of the concentrated fed into the furnace. Pellets having an average size of between about ⅜ inch and ½ inch with a moisture content of about 9% may advantageously be used.

---

This application is a continuation-in-part of United States patent application Ser. No. 627,851 filed on Apr. 3, 1967 now U.S. Pat. No. 3,561,951 from which a divisional application Ser. No. 832,529 was filed on Apr. 14, 1969 now abandoned.

The present invention was developed as an improvement on the continuous process disclosed in U.S. application Ser. No. 432,257 filed Jan. 4, 1965 which issued to U.S. Pat. No. 3,437,475 on Apr. 4, 1969 but may also find use as an extension of other continuous processes for the smelting and converting of copper concentrates to metallic copper.

The invention relates broadly to improved methods and techniques in the smelting and converting of copper concentrates to metallic copper. More particularly, the invention is an improvement in certain aspects of feeding and smelting in a process for the continuous smelting and converting of copper concentrates to metallic copper whereby the smelting and converting stages occur partly simultaneously and partly in sequence in a single reactor vessel and in which the concentrates are introduced continuously at one end, while the slag and copper metal may be removed continuously at the other end of the vessel.

The basic process just described utilizes certain aspects of well-known copper technology, in conjunction with the concepts of continuous gas-liquid processing which have, up to the present time, mostly been used in chemical processing. The process also includes the treatment of the slag produced by reducing gases or other means in order to obtain the maximum copper extraction from the slag either in an appropriate extension of the reduction reactor or in a separate vessel adjacent to the reactor into which the slag can flow by gravity from the reactor vessel to the said separate vessel.

Broadly speaking the basic process comprises the steps of feeding flux and the concentrates to be converted into a furnace, smelting the concentrates and flux in a liquid bath, allowing the resultant matte and slag to flow toward tapping ports in the furnace, introducing an oxidizing gas into the matte sufficient to oxidize any ferrous sulphide present, introducing an oxidizing gas into the resultant white metal gradually to oxidize copper sulphide to metallic copper, allowing the copper to separate from the slag and tapping the metallic copper, wherein the concentrates are fed into the furnace in the form of pellets in such a manner that a substantial portion of the surface area of the liquid bath is covered with a uniformly disposed thin layer of pellets, the feeding of the pellets being so controlled as to prevent the pellets from forming masses of unsmelted material, the feeding of said pellets and the injection of said oxidizing gas being so controlled as to provide smelting rates of between about one hundred pounds and about three hundred pounds per square foot of bath surface per hour.

The present invention also envisages the steps of forming pellets from the concentrates having an average size of between ⅜ inch and ½ inch and containing about 9% by weight of moisture. The invention also includes the feature that the dust loss of the concentrates resulting from the feeding and smelting thereof is maintained between about 0.85% and 2.14% by weight of the concentrate fed into the furnace.

The advantages that can be realized in a continuous smelting and converting process are numerous. In particular, the smelting rate is considerably higher than that which is possible in the conventional reverberatory furnace. In the latter, the charge on the charge banks receives heat mainly by radiation from the combustion flame, from the furnace gases, and from the furnace walls, and the thermal efficiency is not great. Although little or no heat is produced in the molten bath, the bath does represent a source of stored-up heat and the charging of moist concentrate onto the surface of the bath, has been suggested in the prior art, for example, by Kuzell in U.S. Pat. 2,657,990. It has also been suggested in the prior art, for example, in Beals et al. U.S. Pat. 3,222,162, that smelting rates in the conventional reverberatory furnace can be increased by splashing molten material from the bath onto the charge banks, the molten material being essentially superheated and the splashing being effected by the injection of oxygen-rich gas into the bath in the vicinity of the charge.

In contrast, in a continuous smelting and converting process with which the present improvement may be used, highly exothermic reactions take place in the bath, and the latter represents a heat source which is even more important than that provided by radiation from the combustion flame, from the furnace gases, and from the walls of the continuous smelting and converting apparatus, the bath being in direct contact with the charge to be smelted.

It has been found that in the continuous smelting and converting process previously mentioned heat transfer to the charge is even further enhanced by preparing the charge in the form of pellets, prior to its introduction into the furnace. Particular advantages are obtained in terms of reduced dust loss of concentrates and in terms of efficient smelting if carefully controlled feeding techniques are maintained and balanced with oxidizing gas intake.

It has also been found that the tapping methods, commonly in use with converters, anode furnaces, wirebar furnaces, and the like, are not practical for use in conjunction with a continuous smelting and converting apparatus, nor are many of the methods used to tap molten materials, other than copper, from metallurgical furnaces. Suitable tapping techniques are disclosed and claimed in U.S. application Ser. No. 832,529 filed Apr. 14, 1969 which is a divisional application of the aforesaid basic U.S. application Ser No. 627,851.

It is therefore a main object of the present invention to provide improved techniques for preparing and feeding copper concentrates and ores to a continuous smelting and converting apparatus.

According to one aspect of the present method, there is provided means for preparing and feeding copper concentrates and ores to an apparatus for continuous smelting and converting of copper concentrates and ores which comprises the pelletizing of wet concentrates or ores which may be formed with or without additives and with or without mixing a portion or the whole of the silica flux required for converting. Additionally, the pellets may be fed into the apparatus with or without drying and with or without admixed lumps of silica flux, for continuous smelting and converting in such a manner that a large surface area of the bath is covered with a thin layer of pellets, thus seeking to allow each pellet to come in contact with the liquid bath so that the pellets are inhibited from forming large masses of unsmelted material and also smelt at a high and efficient rate per unit surface area of the bath.

It has been found that heat transfer to the charge is enhanced when the charge is in the form of pellets, produced prior to introduction into the continuous smelting and converting furnace. Copper concentrates, produced by flotation, can be pelletized easily without any additive, such as bentonite, and after pelletizing, the pellets may be partially dried prior to introduction into the smelting and converting furnace, depending on the relative costs of drying them prior to or inside the furnace. It has been found that wet pellets from a pelletizing machine can be introduced directly into the continuous smelting and converting furnace without presenting any operating problems, such as for example, the explosions which were sometimes experienced when wet, unpelletized concentrates were charged into a molten bath of slag and matte.

When reference is made to "pellets" in this application, it is intended to include concentrates in the form of agglomerates and prepared formations of a wide range of manageable sizes which will occur to the man skilled in the art and is not intended to be limited to the somewhat narrowly defined round pellet formation which can be associated with other arts.

With respect to the silica flux which is required for converting, and which must be charged into the continuous smelting and converting furnace, if it is acceptable from an economic point of view, it is preferable to grind the entire amount of flux to below 10 mesh and to incorporate the flux in the charge pellets, thus producing a type of self-fluxing pellet. The aforementioned procedure simplifies the control of the slag composition and eliminates any possibility of segregation of the flux in the continuous furnace. If, however, incorporation of the entire amount of flux in the pellets is not acceptable, it may be desirable to separate fines less than 10 mesh size from the flux, and to incorporate these in the pellets, thus minimizing the loss of flux fines from the continuous furnace. In addition, the preparation of pellets affords a convenient means of incorporating dust fines from such sources as flues, Cottrell or Cyclone separators and collected from the flue gas exiting from the continuous smelting and converting furnace.

The method of feeding the pellets to the furnace is such that a large area of the bath is covered with pellets fed at such a rate that a relatively thin layer of pellets is formed on the surface of the bath, and slag and matte can circulate freely between adjacent pellets, the circulation being further enhanced by the mixing and agitating action of the air introduced through tuyeres. Consequently, the pellet charge presents a very high surface area per unit weight to heat transfer. It has also been found that the pellets tend to smelt individually without agglomeration into large masses of unsmelted material. Such agglomeration, which may decrease the smelting rate, and particularly in the case of wet material, could entrap gases thus causing minor explosions in the bath. It has also been found that the individual pellets tend to remain coherent while smelting.

Where silica flux is not incorporated in the pellets, or only a part, as for example the fines, is incorporated, it has been found advantageous to feed the required flux, or balance of flux, with the pellets so that a large area of the bath is covered with a relatively thin layer of pellets interspersed with lumps of flux. In this way, both the pellets and the flux present a very high surface area per unit weight to heat transfer. It has been found that there is no tendency for either the pellets or the flux to agglomerate into large masses, and this method of feeding results in greatly increased rates of smelting.

A preferred apparatus for feeding the pellets onto the bath is a type of slinger belt, the speed of which is variable over a given time interval and which is also subjected to a swinging action over a small arc, in both a horizontal and vertical plane, thus resulting in the spreading of the pellets over a wide surface area of the bath. However, any other suitable charging means may be employed.

EXAMPLE I

Flotation copper concentrate, having an average composition (dry basis) of 26% Cu, 34% S, 27% Fe, 3% $SiO_2$ and 10% other, was pelletized in a 10-foot diameter pelletizing disc. The pellets ranged from about ⅜-inch to about ½-inch diameter and contained about 9% moisture on the average. The pellets, and minus ⅜-inch silica flux having an average composition (dry basis) of 68% $SiO_2$, 4% Fe and 28% other, were fed onto a common conveyor belt and charged into a 7-foot inside diameter continuous smelting and converting furnace using a belt slinger. The slinger was programmed to distribute the pellets and flux uniformly on the surface of the molten bath of slag and matte in the smelting and converting zone of the furnace which had an effective surface area of 80 square feet. A total of 5,358 dry tons of concentrate was smelted and converted at an average smelting rate of 4.2 tons per hour and an average air blowing rate of 3,550 standard cubic feet per minute. This smelting rate corresponds to an average of 105 pounds of concentrate per square foot of bath surface per hour. Smelting rates up to 150 pounds per square foot of bath surface per hour were obtained in other tests and the maximum smelting rate had not yet been determined. In an industrial scale furnace smelting rates up to 300 pounds per square foot of bath surface per hour are anticipated. In contrast, in an industrial reverberatory copper smelting furnace the equivalent smelting rate was determined to average only about 83 pounds per square foot of bath surface per hour.

A further advantage of using pelletized feed is that lower dust losses result compared with unagglomerated concentrate. The following example demonstrates lower dust losses using pellets compared with unagglomerated feed.

EXAMPLE 2

Two dust loss tests were carried out in a semi-industrial scale continuous smelting and converting furnace. The test conditions and the results obtained were as follows:

|  | Test No. 1 | Test No. 2 | Average calculation of Tests 1 and 2 |
|---|---|---|---|
| Duration of dust loss test, hours | 5.75 | 4.50 | |
| Air blowing rate during test, standard cubic feet per minute | 3,000 | 3,500 | |
| Concentrate pellet feed rate during test, tons per hour | 3.74 | 4.42 | |
| Dust carryover, percent of concentrate pellet feed | 2.14 | 0.85 | 1.49 |
| Metal in dust carryover, percent of metal in concentrate pellet feed: | | | |
| Copper | 1.85 | 0.45 | 1.15 |
| Silver | 2.09 | 0.97 | 1.53 |
| Zinc | 5.53 | 2.53 | 4.03 |
| Lead | 6.17 | 3.88 | 5.03 |

The higher figures for lead and zinc than for copper show that the dust includes some lead and zinc fume. From these figures it can be seen that the copper content of the dust is less than the copper content of the concentrate.

In contrast, during periods when unagglomerated concentrate was fed into the furnace the dust carryover was estimated to be about 10%, and visibility inside the furnace, which normally allows the bath surface to be observed, was reduced to nil.

The improvements in feeding and smelting presented herein represent significant practical and economical advances in the development of continuous smelting and converting of copper concentrates to metallic copper.

We claim:

1. A continuous process for smelting and converting copper concentrates to meallic copper, which comprises the steps of:
   (a) feeding flux and concentrates into a furnace;
   (b) smelting the concentrates and flux in a liquid bath;
   (c) allowing the resultant matte and slag to flow toward tapping ports in the furnace;
   (d) introducing an oxidizing gas into the furnace so as to produce metallic copper;
   (e) allowing the copper to separate from the slag and tapping the metallic copper;
   (f) positioning a feeding device such as a slinger belt at the feeding end of said furnace so as to receive the formed pellets and feed them into said furnace;
   (g) gauging the speed of said feeding device and hence the feed rate of said pellets and varying the horizontal or vertical delivery path of said device so that a substantial portion of the surface area of the liquid bath is covered with a uniformly disposed thin layer of pellets said layer being subtantially free of masses of unsmelted material; and
   (h) the feeding of said pellets and the injection of said oxidizing gas being such as to provide smelting rates of between about one hundred pounds and about three hundred pounds per square foot of bath surface per hour.

2. A continuous process for smelting and converting copper concentrates to metallic copper, which comprises the steps of:
   (a) feeding flux and concentrates into a furnace;
   (b) smelting the concentrates and flux in a liquid bath;
   (c) allowing the resultant matte and slag to flow toward tapping ports in the furnace;
   (d) introducing an oxidizing gas into the matte sufficient to oxidize any ferrous sulphide present;
   (e) introducing an oxidizing gas into the resultant white metal gradually to oxidize copper sulphide to metallic copper;
   (f) allowing the copper to separate from the slag and tapping the metallic copper;
   (g) forming pellets from said concentrates having an average size of between about ⅜ inch and about ½ inch and containing about 9% by weight of moisture;
   (h) positioning a feeding device such as a slinger belt at the feeding end of said furnace so as to receive the formed pellets and feed them into said furnace;
   (i) gauging the speed of said feeding device and hence the feed rate of said pellets and varying the horizontal or vertical delivery path of said device so that a substantial portion of the surface area of the liquid bath is covered with a uniformly disposed thin layer of pellets said layer being substantially free from masses of unsmelted material; and
   (j) the feeding of said pellets and the injection of said oxidizing gas being such as to provide smelting rates of between about one hundred pounds and about three hundred pounds per square foot of bath surface per hour.

3. A process as claimed in claim 2 wherein the dust loss of said concentrates resulting from the feeding and smelting thereof is maintained between about 0.85% and 2.14% by weight of the concentrate fed into said furnace.

4. A process as claimed in claim 2 wherein the pellets of concentrate incorporate at least a portion of the flux required for smelting.

5. A process as claimed in claim 4 wherein the flux is ground to an average particle size of below 10 mesh (ASTM standard sieve) before being incorporated in the pellets of concentrate.

6. A process as claimed in claim 2 wherein the pellets of concentrate are mixed with a silica flux.

7. A process as claimed in claim 2 wherein the pellets are dried before being fed into the furnace.

8. A process as claimed in claim 2 wherein the pellets are fed to the furnace when wet.

References Cited
UNITED STATES PATENTS

| | | | |
|---|---|---|---|
| 3,437,475 | 4/1969 | Themelis et al. | 75—74 X |
| 3,561,951 | 2/1971 | Themelis et al. | 75—73 |

L. DEWAYNE RUTLEDGE, Primary Examiner

J. E. LEGRU, Assistant Examiner

U.S. Cl. X.R.

75—72, 74, 76